United States Patent [19]

Wilken

[11] 4,326,641
[45] Apr. 27, 1982

[54] LIQUID TANK ANTI-THEFT DEVICE

[76] Inventor: Robert J. Wilken, 3128 Leslie La., Eau Claire, Wis. 54701

[21] Appl. No.: 182,012

[22] Filed: Aug. 28, 1980

[51] Int. Cl.³ .......................... B65D 25/02; B67C 3/00
[52] U.S. Cl. ................................. 220/86 AT; 141/392
[58] Field of Search ........................ 220/86 AT, 86 R; 141/392

[56] References Cited

U.S. PATENT DOCUMENTS

| | | | |
|---|---|---|---|
| 1,931,335 | 10/1933 | Terry | 220/86 AT |
| 2,107,600 | 2/1938 | Darms | 220/86 AT |
| 2,313,266 | 3/1943 | Roberts | 220/86 AT |
| 2,373,470 | 4/1945 | Hanke | 220/86 R X |
| 2,496,992 | 2/1950 | Glidden | 220/86 AT |
| 3,880,317 | 4/1975 | Arnett | 220/86 R |

FOREIGN PATENT DOCUMENTS

| | | | |
|---|---|---|---|
| 948573 | 6/1974 | Canada | 220/86 AT |
| 2205239 | 8/1973 | Fed. Rep. of Germany | 411/411 |

*Primary Examiner*—Allan N. Shoap
*Attorney, Agent, or Firm*—James E. Nilles

[57] ABSTRACT

A liquid tank anti-theft device for use in a tank filler tube of the type having an apertured plate fixed therein to limit the size of gas nozzle insertable therein. The device acts to prevent insertion of gas removal means, such as a siphon tube, therein. The device comprises a tubular member for insertion in the tank filler tube and includes a projection or flange at the top of the member and also thread-like means for cooperatively engaging the apertured plate and preventing removal of the device from the tank filler tube. Insertion of a siphon tube is prevented by means such as a screen-like grid at the lower end of the tubular member.

7 Claims, 3 Drawing Figures

LIQUID TANK ANTI-THEFT DEVICE

BACKGROUND OF THE INVENTION

1. Field of Use

This invention relates to liquid tank anti-theft devices for placement within a tank filler tube which prevents insertion of a siphon tube or other liquid removal means in the tank.

2. Description of the Prior Art

Some prior liquid tank anti-theft devices have inherent disadvantages in that they are only with some difficulty permanently secured in the tank filler tube, which securement is essential to prevent their unwarranted removal. For Example, the device described in U.S. Pat. No. 2,107,600, issued to Darms on Feb. 8, 1938, and entitled "Gas Keeper", can only be secured by bending a plurality of tongues into place under the tank filler aperture using a screw driver or the like. Those devices which may be secured to the filler tube merely by insertion therein and thus, not having the disadvantages of Darms, are typically of construction that is somewhat complicated and thus expensive. For example, the device in U.S. Pat. No. 2,147,755, issued to Roberts on Feb. 21, 1939, and entitled "Siphon and Theftproof Gas Tank Cover", is secured by a ratchet upon its insertion into the tank filler tube. Roberts has the further disadvantage of requiring its own tank filler tube cap. The filler cap supplied with a Roberts device intended to be retrofitted to an automobile must have a seal for preventing release of gasoline vapors therethrough complying with the appropriate government standards. Because the automobile's original complying cap may not be used on a Roberts device, the retrofit of Roberts on an auto is needlessly expensive. Still other anti-theft devices may not be used on all of the several different filler tube apertures. In automobiles, for example, holes in the spacers of tank fill tube apertures are flared inwardly, that is, towards the fuel tank, for strength, and the extent of the inward flare varies with the auto manufacturer. Many antisiphon devices, such as that shown in U.S. Pat. No. 2,145,759, issued to Fellows on Jan. 31, 1939, and entitled "Antisiphon Devices for Fuel Tanks", have rigid locking lugs for securing the device to an aperture. These rigid lugs may only be used on an aperture with one flare depth, limiting the device's applicability to autos having apertures with that flare depth.

SUMMARY OF THE INVENTION

A liquid tank anti-theft device is provided for use in a tank filler tube for the liquid tank, the tube having a plate extending across its upper portion and the plate having an aperture of a size to limit the size of a filling nozzle to be inserted therein. The device comprises an elongated tubular member with an upper and lower end, an outwardly extending projection at the upper end of the tubular member, thread-like means on the tube, and means at the lower end of the tubular member to prevent insertion of a liquid removal means into the liquid tank.

The elongated, tubular member may have a plurality of holes therein for venting of air during filling of the tank and the projection may comprise a flange around the circumference of the upper end of the tubular member. The thread-like means may comprise a spring helically wound around the tubular member, which spring is fixed to the tubular member at the end of the spring opposite from the upper end of the tubular member. The thread-like means on the tube provide for threaded engagement with the plate and entry of the tubular member into the tank filler tube, the thread-like means being inserted within the tube so that the thread-like means abuts against the inner side of the plate and the projection rests against the opposite side of the plate to prevent removal of the tubular member from the tube. The liquid removal prevention means may comprise a screen-like grid, and the device may be constructed of a non-sparking material such as copper so that it may be safely placed in tanks containing flammable liquids.

The invention has several advantages over the relevant prior art. The device's securement within the filler tube is permanent, accomplished merely by insertion, and assured by inexpensive thread-like means such as a spring. The device has no protruding parts and does not depend upon the threads in the spout head for its securement in the tank filler tube, so the tank's original cap may still be used. The spring that may comprise the device's thread-like means is helically wound around the device's body, or its tubular member, and is attached to the body only at the spring's lower end. Hence, the spring may contract downwardly on the body so that the distance between the flange around the tubular member's upper end and the top of the spring may be increased to accommodate a filler tube aperture with a greater flare depth, making the device suitable for universal application in vehicular tank filler tubes. The device is manually inserted in the filler tube and no tools are required. The device may be made of brass, copper, or other non-sparking materials so that it can be safely inserted into tank filler tubes containing the vapors of explosive or flammable liquids. Other objects and advantages of the invention will appear hereinbelow.

DESCRIPTION OF A PREFERRED EMBODIMENT

Figure 1:
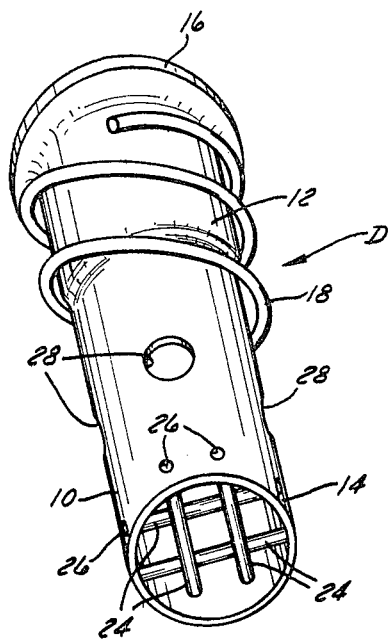
FIG. 1 is a perspective view of an anti-theft device comprising a preferred embodiment of the invention.
Figure 2:
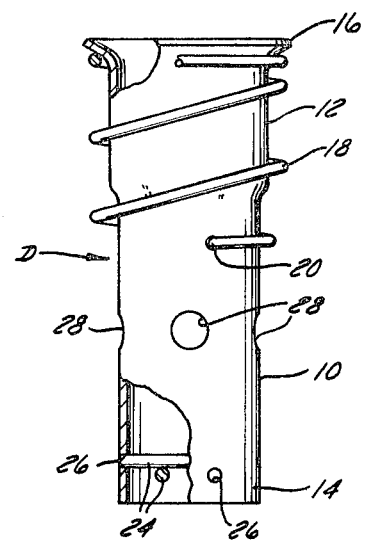
FIG. 2 is a side view of the device, with certain parts broken away, shown in FIG. 1.

The anti-theft device described herein may be used on tanks containing any kind of liquid, but for illustrative purposes the device will be described in the environment of a fuel-containing tank of a motor vehicle.

The device is typically inserted in a tank filler tube 2 of the fuel-containing tank. The filler tube 2 will have extending across and rigidly mounted to its upper portion a plate 4. Filler tubes for automobiles which may use only unleaded gasoline frequently contain such a plate 4, and further have an aperture 6 within that plate 4 for limiting the size of a filling nozzle 8 that may be inserted into the filler tube 2. This prevents introduction of leaded fuels, which are dispensed through nozzles larger than the aperture 6, into the automobile's tank.

The anti-theft device for tanks containing flammable and explosive fuels is preferably made of a nonsparking material or materials, such as bronze or copper, to ensure that upon its insertion into a filler tube 2 no sparks are created. The device D comprises an elongated, tubular member 10 of outer diameter sufficiently small to permit insertion thereof through the aperture 6 and of inner diameter sufficiently large to accommodate the nozzle 8. For example, nozzles for dispensing unleaded gasoline at roadside gasoline stations are 13/16" in diameter, so the inner diameter of the tubular member 10 must be large enough to accommodate a 13/16" nozzle.

Figure 3:
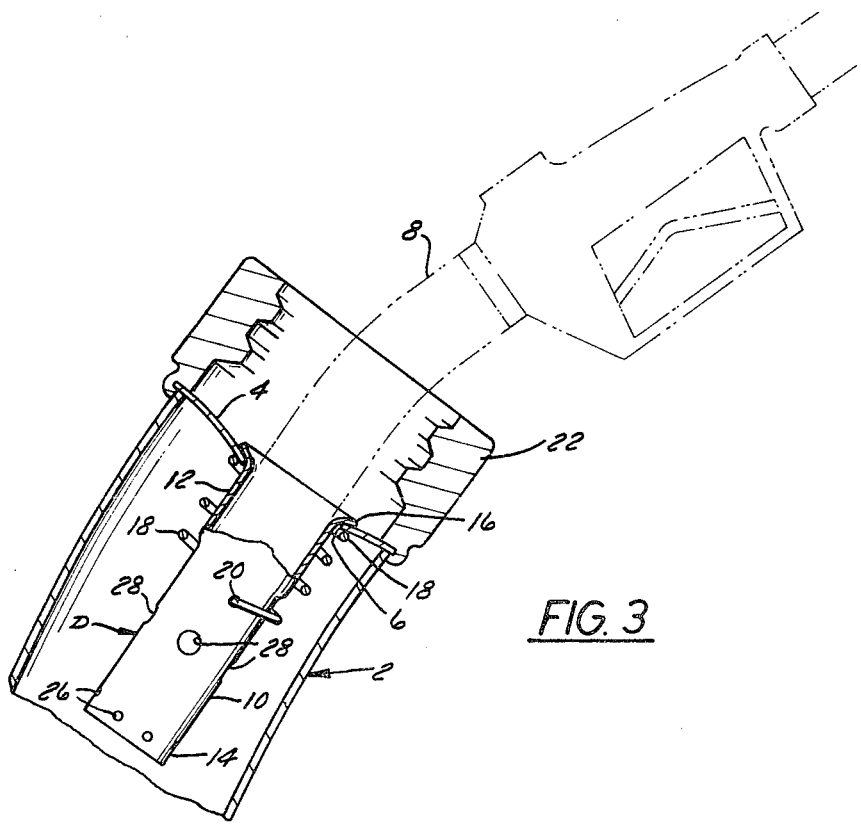
FIG. 3 is a cross sectional view of the anti-theft device in place in a tank filler tube of a liquid tank.

The elongated member 10 has an upper end 12 and a lower end 14, and also has attached thereto an outwardly extending projection, which may comprise a flange 16 around the circumference of the upper end 12. The lower end 14 of the device will be the first part of that device inserted through the aperture 6 in plate 4. The projection or flange 16 is larger than the aperture 6, and as the member 10 is pushed into and enters tank filler tube 2, it will be stopped when the flange 16 abuts against the plate 4 surrounding aperture 6, as shown in FIG. 3.

Thread-like means are provided on the tubular member 10, and these thread-like means may comprise a spring 18 helically wound around and fixed to the member 10 at the end 20 of the spring 18 opposite the upper end 12 of member 10. The spring 18 provides for threaded engagement with the plate 4 as the tubular member 10 is rotatably inserted through aperture 6 and into tank filler tube 2. After the spring 18 and the member 10 to which it is attached have been inserted into tank filler tube 2 up to flange 16, the spring 18 will abut against the inner side of plate 4 and the flange 16 will abut against the opposite or outer side of the plate 4, causing cooperative gripping of the plate 4 and fixing the device in a rigid, stationary position within the tube 2. The spring 18 thus acts as a locking device, so that the cooperative gripping of the plate 4 will prevent removal of the tubular member 10 from tube 2, and thus prevent defeating the device's purpose by such removal. The end 20 of spring 18 may be inserted in an orifice in member 10 and 63%/37% stainless steel soldered in place to prevent rattling or movement of the spring 18. Because only the lower end 20 of the spring 18 is fixed to the member 10, the spring 18 may be contracted downwardly from its upper end and compressed so that there is a greater distance between the flange 16 and the upper end of the spring 18. This additional space is required so that the device may tightly engage apertures 6 having various flare depths.

The device is of substantially the same outside diameter as, and thus fits very closely in, the aperture 6. Because of this close fit and because of the tight engagement of the spring 18 on one side of the aperture 6, the device in place in the tank filler tube 2 as shown in FIG. 3 is permanently installed and virtually impossible to unscrew and remove.

The tanks are typically sealed at the tank filler tube 2 by a gas cap threadably engaged to a spout head 22. As shown in FIG. 3, the device in place is substantially contained on the fuel tank side of the aperture 6 and only the flat flange 16 extends through to the spout head side of aperture 6. Thus, the device does not in any way interfere with the threaded engagement of the gas cap on the spout head 22, and the automobile's original gas cap may be used with the device.

To prevent insertion of a siphon tube or other liquid removal means into the fuel-containing tank, means are provided at the lower end 14 of the tubular member 10, and such means may include rods 24. The rods are cut to appropriate lengths so that they may be radially inserted at the lower end of the tubular member and parallel or perpendicular to one another so as to form a screen-like grid (FIG. 1). The rods 24 are fixed to member 10 by soldering the ends of the rods at openings 26 along the lower end 14. The screen-like grid is of a small enough mesh to prevent insertion of siphon tubes but of large enough mesh to permit rapid filling. For automobile gasoline tanks, a screen-like grid with $\frac{1}{4}''$ by $\frac{1}{4}''$ openings is suitable.

As a liquid is poured into a tank, it displaces air contained in that tank. This air must escape through the tank filler tube 2, and its escape is made more difficult by the device placed therein. A plurality of antisurge holes 28 are placed in the tubular member 10, more readily permitting the escape of air from the tank.

RECAPITULATION

The invention is a liquid tank anti-theft device suitable for use in a tank filler tube. The device is permanently secured in the filler tube by inexpensive means therefor merely by twisting it through the filler aperture. The device has no parts that protrude in such a manner as to interfere with the use of the tank's original cap, thus ensuring a continued gas-tight seal of the tank and eliminating potential liquid loss and pollution by spilling or escape of vapors through the use of an improper replacement cap. The device has a threaded means therearound for tightly securing the device to the inward flare of the tank filler's aperture over a wide range of flare depths.

What I claim is:

1. A liquid tank anti-theft device for use in a tank filler tube for said tank and having a plate extending across an upper portion of said tube, said plate having an aperture of a size to limit the size of a filling nozzle to be inserted therein, said device comprising an elongated tubular member with an upper and lower end, an outwardly extending projection at said upper end of said tubular member, thread-like means on the periphery of said tubular member to provide threaded engagement with said plate and entry of said tubular member into said tank filler tube, said thread-like means together with said tubular member being inserted sufficiently far within said tube so that an upper part of said thread-like means abuts against the under side of said plate and said projection rests against the opposite side of said plate to prevent removal of said tubular member from said tube, and means at the lower end of said tubular member to prevent insertion of a liquid removal means into said liquid tank.

2. The device as described in claim 1, wherein said projection comprises a flange around the circumference of said upper end of said tubular member.

3. The device as described in claim 2, wherein said thread-like means comprises a spring helically wound around said tubular member, said spring being fixed to said tubular member at the end of said spring remote from the upper end of said tubular member.

4. The device as described in claim 1, wherein said thread-like means comprises a spring helically wound around said tubular member, said spring being fixed to said tubular member at the end of said spring remote from the upper end of said tubular member.

5. A liquid anti-theft device for use in a tank filler tube for said tank and having a plate extending across an upper portion of said tube, said plate having an aperture of a size to limit the size of a filling nozzle to be inserted therein, said device comprising an elongated tubular member with an upper and lower end, an outwardly extending flange around the upper end of said tubular member, a helically wound spring around said tubular member to provide threaded engagement with said plate and entry of said tubular member into said tank filler tube, said spring together with said tube being inserted sufficiently far within said tube so that one end of said spring abuts against an under side of said plate, said spring being fixed to said tubular member at the other end of said spring, and said flange rests against the opposite side of said plate to prevent removal of said tubular member from said tube, said tubular member having a plurality of holes therein for venting of air therethrough during filling of said tank, said device being constructed of a non-sparking material, and means at the lower end of said tubular member to prevent insertion of a liquid removal means into said liquid tank.

6. In combination with a fuel-containing tank of a motor vehicle, a fuel tank anti-theft device for use in a tank filler tube for said tank and having a plate extending across an upper portion of said tube, said plate having an aperture of a size to limit the size of a filling nozzle to be inserted therein, said device comprising an elongated tubular member with an upper and lower end, an outwardly extending projection at said upper end of said tubular member, thread-like means on said tubular member to provide threaded engagement with said plate and entry of said tubular member into said tank filler tube, said thread-like means being inserted within said tube so that an upper part of said thread-like means abuts against the under side of said plate and said projection rests against the opposite side of said plate to prevent removal of said tubular member from said tube, and means at the lower end of said tubular member to prevent insertion of a fuel removal means into said fuel tank.

7. In combination with a fuel-containing tank of a motor vehicle, a fuel tank anti-theft device for use in a tank filler tube for said tank and having a plate extending across an upper portion of said tube, said plate having an aperture of a size to limit the size of a filling nozzle to be inserted therein; said device comprising an elongated tubular member with an upper and lower end; an outwardly extending flange around the circumference of said upper end of said tubular member; a spring helically wound around said tubular member, said spring being fixed to said tubular member at the end of said spring remote from the upper end of said tubular member, said spring providing for threaded engagement with said plate and entry of said tubular member into said tank filler tube, said spring being inserted within said tube so that an upper part of said spring abuts against the under side of said plate and said flange rests against the opposite side of said plate to prevent removal of said tubular member from said tube; a screen-like grid at the lower end of said tubular member to prevent insertion of a fuel removal means into said fuel tank; and a plurality of holes in said tubular member for venting of air therethrough during filling of said fuel tank, said device being constructed of a non-sparking material.

* * * * *